No. 745,908. PATENTED DEC. 1, 1903.
G. M. RIED.
PISTON ROD PACKING.
APPLICATION FILED MAR. 27, 1903.
NO MODEL.
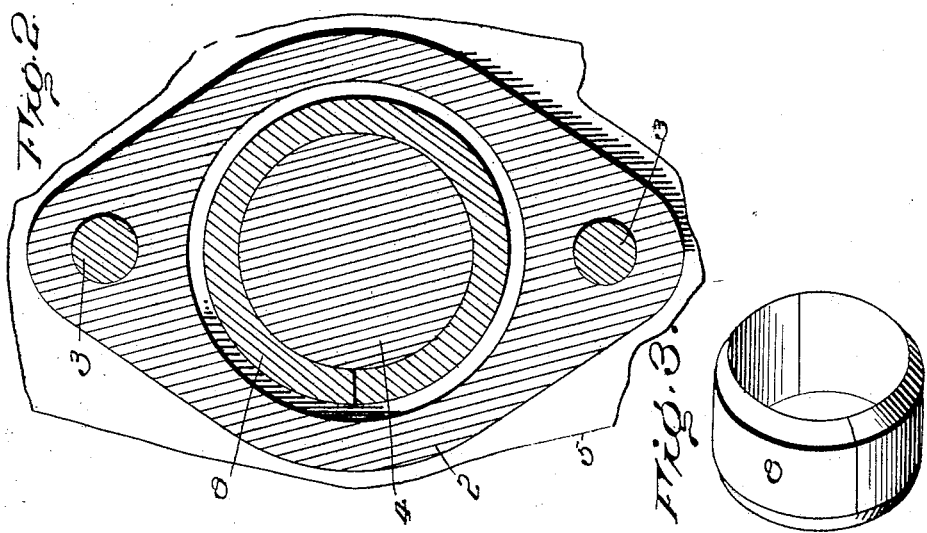
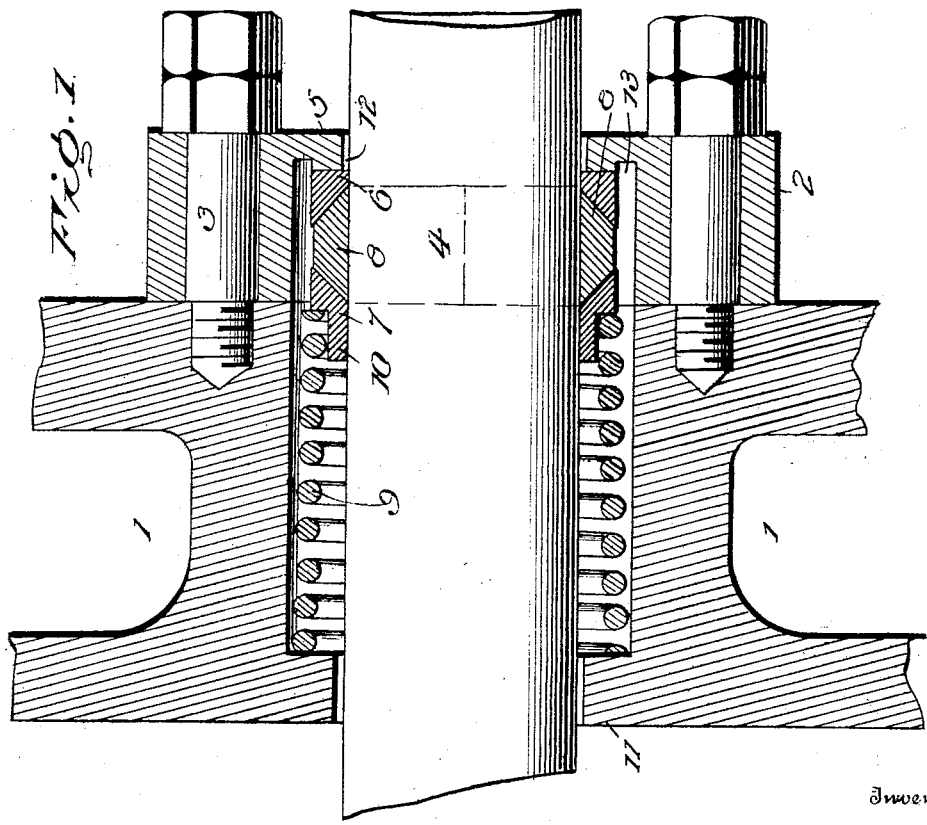
Witnesses
Inventor
George M. Ried
By Lacey
Attorneys No. 745,908. Patented December 1, 1903.

UNITED STATES PATENT OFFICE.

GEORGE MILTON RIED, OF MERIDIAN, MISSISSIPPI, ASSIGNOR OF ONE-THIRD TO WM. D. CULBREATH, OF MERIDIAN, MISSISSIPPI.

PISTON-ROD PACKING.

SPECIFICATION forming part of Letters Patent No. 745,908, dated December 1, 1903.

Application filed March 27, 1903. Serial No. 149,895. (No model.)

*To all whom it may concern:*

Be it known that I, GEORGE MILTON RIED, a citizen of the United States, residing at Meridian, in the county of Lauderdale and State of Mississippi, have invented certain new and useful Improvements in Piston-Rod Packing, of which the following is a specification This invention provides a metallic packing for piston-rods of novel construction and adapted to automatically take up wear by spring and steam action, said packing preserving a tight joint and allowing for any vibration of the piston-rod resulting from any cause.

The packing will not wear the piston-rod, is simple, durable, effective, and not liable to require frequent repairs.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a longitudinal section of a stuffing-box and piston-rod packing embodying the invention, a portion of the piston-rod being shown by the full lines. Fig. 2 is a view about on the line X X of Fig. 1. Fig. 3 is a detail perspective view of the packing-ring, showing same composed of two sections.

Corresponding and like parts are referred to in the following description and indicated in all the views of the drawings by the same reference characters.

The stuffing-box is indicated at 1 and the gland at 2, the latter being secured to the stuffing-box by bolts 3. The piston-rod 4 passes loosely through the inner end of stuffing-box 1 and outer end of gland 2, so as to vibrate without striking same, thereby obviating the wear incident to a close fit and contact therewith. The gland 2 is provided with an inner flange 5, against which the outer end of the packing bears and obtains a steam-tight joint.

The packing comprises rings 6 and 7 and split ring 8, the latter having its ends of conical formation to fit corresponding conical depressions of rings 6 and 7. The packing-rings 6, 7, and 8 are of composition, such as commonly employed in piston and rod packing. The conical packing-ring 8 may be split or may be composed of sections, the latter construction being indicated in Fig. 3. When the rings 6 and 7 are subjected to inward pressure, the packing-ring 8 is compressed, so as to contract its opening and cause same to snugly embrace piston-rod 4 and automatically take up any wear. A stout spring 9 is located in the stuffing-box and confined between the inner end thereof and ring 7 and exerts an outward pressure on said ring sufficient to insure a steam-tight fit between the component parts. The inner end of ring 7 is reduced, forming extension 10, which enters the outer end of spring 9 and holds same in place and central with reference to ring 7, so as to exert a uniform pressure at all points in the circumference of ring 7. The parts 6, 7, 8, and 9 are of less diameter than the space between the walls of the stuffing-box. Hence the steam from the engine-cylinder has free access to the packing and is enabled to supplement the action of spring 9, as will be readily comprehended. The stuffing-box has an inner flange 11 at its rear end to sustain the inward stress of the spring 9. The opening of the stuffing-box and the gland is of uniform diameter throughout its length to obviate projecting shoulders for the parts of the packing or spring to catch on. The inner flange 5 of the gland has a rearwardly thickened or extended portion to form a seat 12, which is trued for the outer end of the packing to obtain a steam-tight fit against. An annular space 13 surrounds the seat 12 to catch any accumulation and prevent its crowding into the joint formed between the packing and the seat 12.

Having thus described the invention, what is claimed as new is—

In piston-rod packing, the combination of the stuffing-box and gland having an opening of uniform diameter throughout its length to provide smooth walls, inner flanges at opposite ends of said opening forming a part of, respectively, the stuffing-box and gland, the inner flange of the gland being rearwardly thickened or extended to form a seat spaced from the walls of the opening, the piston-rod passed through the stuffing-box and gland and spaced from the inner flanges thereof to allow for vibration, a ring mounted upon the piston-rod and having its outer end square and fitting steam-tight against the raised seat at the rear side of the inner flange of the gland, and having its inner end beveled to form a conical depression, a companion ring slipped upon said piston-rod and having a conical depression in its inner end and its outer end reduced, a split ring arranged between the two rings and having its ends made conical to fit the corresponding depressions in the subjacent sides of the juxtaposed rings, and a spring interposed between the inner flange of the stuffing-box and the shoulder formed at the base of the reduced portion of the innermost ring, substantially as specified.

In testimony whereof I affix my signature in presence of two witnesses.

GEORGE MILTON RIED. [L. S.]

Witnesses:
H. W. MIXSELL,
H. W. SCHLAGER.